United States Patent
Jones et al.

(10) Patent No.: US 9,152,612 B2
(45) Date of Patent: Oct. 6, 2015

(54) INPUT CONTROL PROCESSING

(75) Inventors: Matthew W. Jones, Bothell, WA (US); Brian Hartman, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 354 days.

(21) Appl. No.: 13/230,853

(22) Filed: Sep. 13, 2011

(65) Prior Publication Data

US 2013/0067316 A1 Mar. 14, 2013

(51) Int. Cl.
| | | |
|---|---|---|
| *G06F 17/00* | (2006.01) | |
| *G06F 17/21* | (2006.01) | |
| *G06F 3/0484* | (2013.01) | |
| *G06F 17/25* | (2006.01) | |
| *G06F 17/26* | (2006.01) | |
| *G06F 17/28* | (2006.01) | |

(52) U.S. Cl.
CPC .............. *G06F 17/21* (2013.01); *G06F 3/0484* (2013.01); *G06F 3/04847* (2013.01); *G06F 17/211* (2013.01); *G06F 17/25* (2013.01); *G06F 17/26* (2013.01); *G06F 17/28* (2013.01)

(58) Field of Classification Search
CPC ....... G06F 17/21; G06F 17/28; G06F 17/211; G06F 17/25; G06F 17/26; G06F 3/0484; G06F 3/04847
USPC ......... 715/810, 221–237, 748, 749, 742, 744, 715/767, 808–809, 203–204, 171, 762, 715/795–796
See application file for complete search history.

(56) References Cited

U.S. PATENT DOCUMENTS

| | | | |
|---|---|---|---|
| 7,181,700 | B2 | 2/2007 | Guerrero |
| 7,284,193 | B1 | 10/2007 | Lindhorst et al. |
| 7,395,502 | B2 | 7/2008 | Gibbons, Jr. et al. |
| 7,451,352 | B1* | 11/2008 | Moore et al. ............... 714/38.14 |
| 2004/0030710 | A1* | 2/2004 | Shadle ........................... 707/102 |
| 2004/0169688 | A1* | 9/2004 | Burdick et al. ............... 345/854 |
| 2005/0060718 | A1* | 3/2005 | Lindhorst et al. ............ 719/315 |
| 2005/0257162 | A1* | 11/2005 | Danninger et al. ........... 715/764 |
| 2005/0268222 | A1 | 12/2005 | Cheng |
| 2006/0036568 | A1* | 2/2006 | Moore et al. ...................... 707/1 |
| 2008/0178073 | A1* | 7/2008 | Gao et al. ...................... 715/243 |
| 2009/0259934 | A1* | 10/2009 | Prisament ..................... 715/234 |

OTHER PUBLICATIONS

"Client Script in ASP.NET Web Pages", Retrieved at <<http://technet.microsoft.com/en-us/library/3hc29e2a.aspx>>, Retrieved Date: Jun. 7, 2011, pp. 12.

(Continued)

*Primary Examiner* — Quoc A Tran
(74) *Attorney, Agent, or Firm* — Jim Banowsky; Judy Yee; Micky Minhas

(57) ABSTRACT

A system and method for facilitating the processing of an expansion list. A script associated with an HTML document performs actions to process the expansion list. Actions include detaching the list of input controls from the HTML DOM when the list is not displayed and reattaching the list when it is displayed. Actions may also include maintaining the value of each input control, and processing each input control selection to update the value. The script may send value data to a server using a technique such as a hidden field or another element in the HTML DOM.

18 Claims, 9 Drawing Sheets

(56) References Cited

OTHER PUBLICATIONS

"HTML DOM Hidden Object", Retrieved at <<http://www.w3schools.com/jsref/dom_obj_hidden.asp>>, Retrieved Date: Jun. 7, 2011, p. 1.

"JavaScript object model", Retrieved at <<http://publib.boulder.ibm.com/infocenter/domhelp/v8r0/index.jsp?topic=/com.ibm.designer.domino.main.doc/H_JAVASCRIPT_WEB_OBJECTMODEL.html>>, Retrieved Date: Jun. 7, 2011, pp. 2.

* cited by examiner

INPUT CONTROL PROCESSING

BACKGROUND

A common mechanism in client-server communications is to employ an HTML document that is sent from the server to the client and displayed in a browser. The HTML document may include many input controls, such as checkboxes, that are to be optionally selected by a user at the client device. After manipulation by the user, the client may enumerate each input control, collecting the value of each control, and send back a list to the server, the list including the value of each control.

An HTML document may include a script, such as JavaScript, that is executed upon loading of the page by a browser. JavaScript provides a mechanism to enhance or customize functionality of a browser. Generally, operations performed by JavaScript are not as efficient as similar operations performed by a browser. In situations where execution speed is important, a designer may weigh tradeoffs between execution speed and the flexibility of JavaScript.

Web applications, such as an SQL server application, may reside on a server and interact with a client user by using HTML pages. For example, the SQL application may send to the client an HTML page with a set of checkboxes. The user may select various checkboxes, leaving some checked and some unchecked. The browser may enumerate each checkbox, and send to the server the status of each checkbox. The SQL application may use the status values in a variety of ways, such as building an SQL query.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, in one embodiment, a system, method, and components operate to process a document having multiple input controls by attaching and detaching the input controls to the document in response to specified events, as determined by program logic. In one embodiment, in response to a command to display the input controls, the input controls are attached to the document; in response to a command to hide the input controls, the input controls are detached from the document. In response to a configured event, the value of each input control is sent to a server.

In one embodiment, in response to an event of rendering the document, the input controls are detached from the document.

In one aspect of the mechanisms described herein, mechanisms may include encoding the value of each input control in a field of the document, and sending the value data includes sending the field, or a portion thereof, to the server. In one implementation, the field is a hidden field.

In one embodiment, the value of each input control is maintained in an input control value component in memory. In response to a change of the value of an input control, such as by a user selection of the control, the value component is updated to indicate the revised input control value of the input control.

In one embodiment, the input controls are included in an expansion control. Mechanisms may include detaching the expansion control from the document and inserting a substitute control in the document to replace the expansion control. When the substitute control is selected, the expansion control may be attached to the document.

In some implementations, the document is an HTML document that includes a script, the script performing the actions of attaching and detaching controls from a DOM that represents the document. In one implementation, the script is encoded in JavaScript.

In one embodiment, the document and script reside on a server and are sent by the server to a client in response to a request, such as an HTTP request.

To the accomplishment of the foregoing and related ends, certain illustrative aspects of the system are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1:
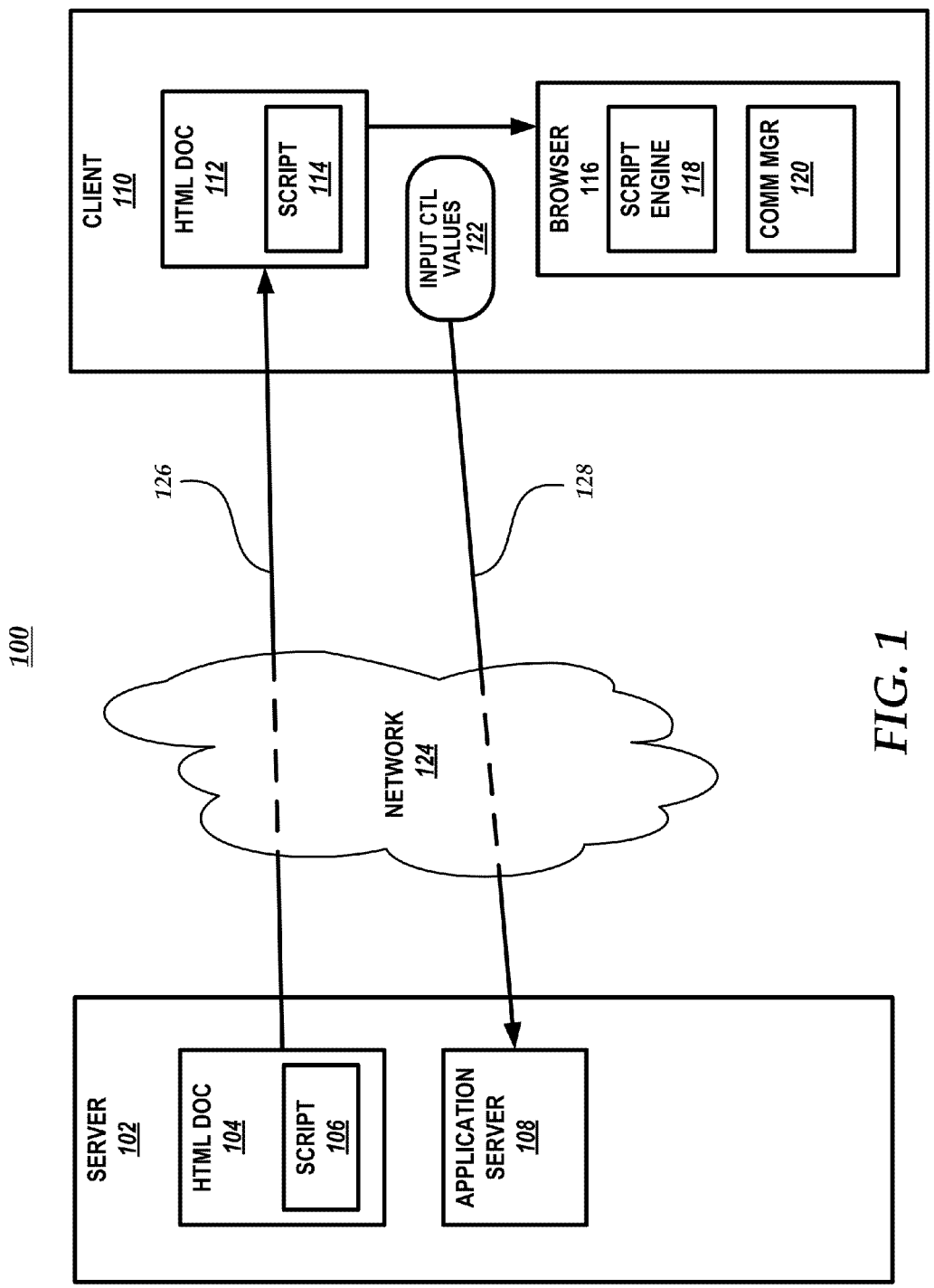
FIG. 1 is a block diagram of an example system in which mechanisms described herein may be deployed.

Example embodiments of the present invention now will be described more fully hereinafter with reference to the accompanying drawings, which form a part hereof, and which show, by way of illustration, specific example embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to a previous embodiment, though it may. Furthermore, the phrase "in another embodiment" as used herein does not necessarily refer to a different embodiment, although it may. Thus, various embodiments of the invention may be readily combined, without departing from the scope or spirit of the invention. Similarly, the phrase "in one implementation" as used herein does not necessarily refer to the same implementation, though it may, and techniques of various implementations may be combined.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processor" refers to a physical component such as an integrated circuit that may include integrated logic to perform actions.

As used herein, the term "expansion list" refers to a user interface mechanism in which activation of the expansion list results in a collection of user interface controls to be displayed. Deactivation of the expansion list results in the collection being removed from view. The terms "drop-down list", "pop-up menu", and "pop-down menu" are sometimes used to describe implementations of expansion lists. In some implementations, when an expansion list is inactive, a title bar is visible. Activation of an expansion list may be triggered by a user selection of the title bar, moving a pointer over an area, input of a command, or other triggering logic. In some embodiments, GUI controls in the collection may be checkboxes, menu items, or other controls that have two or more associated values. In some embodiments the input controls are not limited to having discrete values. For example, one or more GUI controls in the collection may be text boxes in which each associated value is a text string or a numeric equivalent.

As used herein, the term "pointer" refers to a reference to a target physical or logical memory location, data structure, program instruction, or program segment. A pointer "points to" a target and may be used to locate or obtain the target. A pointer may be implemented in a variety of ways, including an address, an offset, an index, or an identifier. A uniform resource identifier (URI) is one type of pointer.

The components described herein may execute from various computer-readable media having various data structures thereon. The components may communicate via local or remote processes such as in accordance with a signal having one or more data packets (e.g. data from one component interacting with another component in a local system, distributed system, or across a network such as the Internet with other systems via the signal). Software components may be stored, for example, on non-transitory computer-readable storage media including, but not limited to, an application specific integrated circuit (ASIC), compact disk (CD), digital versatile disk (DVD), random access memory (RAM), read only memory (ROM), floppy disk, hard disk, electrically erasable programmable read only memory (EEPROM), flash memory, or a memory stick in accordance with embodiments of the present invention.

The term computer-readable media as used herein includes both non-transitory storage media and communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media.

FIG. 1 is a block diagram of an example system 100 in which embodiments may be practiced. FIG. 1 provides a basic understanding of an example system, though many configurations may be employed and many details are not illustrated in FIG. 1. As illustrated in FIG. 1, an example system 100 includes server 102 and client 110, which communicate via network 124. Server 102 may be at least a portion of a Web application server system, such as an SQL server system, which receives queries or commands from client 110, retrieves or updates data, and sends responses to client 110. Server 102 may be a Web server that implements a web site, web service, or performs any of a variety of functions.

Though illustrated as a single server, server 102 may represent one or more servers, each of which may be implemented in the form of a computing device, a blade in a chassis, a processor in a computing device, or a process executing on a computing device.

In the illustrated example system, server 102 includes HTML document 104. HTML is a markup language that is commonly used to encode information sent across networks. The mechanisms described herein may be used with other markup languages, and the descriptions provided herein are applicable to other markup languages, unless clearly stated otherwise. A document that includes a markup language and is primarily based on the markup language structure is referred to as a markup language based document. HTML document 104 may be one of many such documents that are stored, generated, transmitted, or managed by server 102. An HTML document is sometimes referred to as an HTML page. As further illustrated, HTML document 104 may have associated script 106. Script 106 may include various statements, commands, instructions, or data in a specified scripting language. JavaScript is one such scripting language that is commonly used in conjunction with HTML documents.

Though script 106 is illustrated as included within HTML document 104, it is to be understood that in various implementations, HTML document 104 and script 106 may be separate files or components that are associated by pointers, links, or program logic. In general, a script is said to be associated with a document in any of these implementations.

In one embodiment, server 102 includes application server 108, which may perform functions such as communicating with a client, processing data received from a client, or sending HTML documents, scripts, data, or other information to a client. Application server 108 may serve as a front end or employ various other components in order to implement functions of a database service, web site, web service, or other services. In one implementation, application server 108 is implemented by one or more software programs, libraries, or associated software components executed by one or more processors.

In various embodiments, application server 108 performs actions to interface with or facilitate an application. The application may provide a service to one or more clients, store or retrieve data, or perform other programmed actions. For example, in one configuration, application server 108 supports a database, such as an SQL database. It may receive requests from clients, store data received from clients, perform queries received from clients, provide database data to clients, or other such database actions. In some configurations, application server 108 may support a Web site, Web service, or other network based application. A server may have multiple application servers that interface with one or more clients.

In the illustrated embodiment, client 110 includes HTML document 112 and associated script 114. These may be copies of HTML document 104 and script 106, or modifications thereof. In one embodiment, as indicated by arrow 126, HTML document 104 and script 106 are sent from server 102 to client 110 and processed as discussed herein. Application server 108 may facilitate transmission of HTML document 104 or script 106 to client 110. In such a situation, HTML document 112 and script 114 are considered herein to be the same document and script as HTML document 104 and script 106 unless stated otherwise. This reference remains even though the document or script may be modified by various processes. For example, an intermediate component may remove, modify, or insert URLs or other HTML elements. Thus a modified or changed document is considered to be the same document herein.

In the illustrated embodiment, client 110 includes browser 116, which may be used to retrieve and present information from server 102. Microsoft Internet Explorer® is one example of a general purpose browser that may be browser 116, though various configurations may use other general purpose browsers or special purpose browsers. A special purpose browser is a browser that is restricted in some way, such as limiting URLs or IP addresses that may be accessed.

In one embodiment, browser 116 includes or has an associated script engine 118, which may be used to execute scripts, such as script 114. Script engine 118 may be a computer program with instructions that are executed by a processor, though logic of a script engine may reside in an ASIC or other processor. In some embodiments, script engine 118 may be an interpreter that is configured for one or more program languages. In one embodiment, script engine 118 includes a JavaScript interpreter. Thus, a script is considered to include program instructions that may be executed by a script engine, and the script engine may include instructions that are executed by a processor. The instructions of a script are considered to be machine-readable instructions that are executed by a processor, though the execution may employ one or more intermediate programs such as script engine 118.

Script engine 118 may use various objects or methods that are provided in a run-time environment. The run-time environment may be provided by browser 116 or associated libraries or components. In the illustrated embodiment, communications manager 120 is a component associated with browser 116. Communication manager 120 may provide objects or methods that facilitate communication with remote devices, such as server 102, or remote components, such as application server 108. In one embodiment, communication manager 120 provides functionality to enable scripts such as script 114, executed by script engine 118, to communicate in the HTTP protocol, including receiving or sending data. HTTP POST and HTTP GET are examples of HTTP requests that may be sent from script 114 to server 102, as facilitated by communication manager 120. Input control values 122 is a collection of data descriptive of input controls that may be stored on client 110. As indicated by arrow 128, input control values 122 may be sent by script 114 to application server 108 on server 102, as facilitated by communication manager 120. The content and use of input control values 122 is discussed in further detail herein.

In one configuration, communication manager 120 includes an XMLHTTP object that is configured to send or receive data between client 110 and server 102. In one configuration, communication manager 120 may include an Asynchronous JavaScript and XML (AJAX) component. An AJAX component may be in the form of a script library. Generally, it performs functions of sending data to a server and updating HTML on a client. In one configuration, an AJAX component employs an XMLHTTP object to perform actions of sending and receiving data with a server.

In various embodiments, mechanisms include performing actions that modify HTML document 112 one or more times. These modifications may be performed by script 114, as executed by script engine 118, on client 110. As discussed herein, these modifications may be accompanied by retrieving, storing, or sending values of input controls.

Client 110 may be a hand-held computing device, a laptop, smartphone, or other portable computing device, a desktop computer, server, or other relatively stationary computing device. In various systems, clients may be in the form of any one or more computing devices, computer processes, modules, or similar component.

As illustrated, server 102 and client 110 may communicate with each other through network 124. Network 124 may include a local area network, a wide area network, direct connections, or a combination thereof. In one embodiment, network 124 includes the Internet, which is a network of networks. Network 124 may include wired communication mechanisms, wireless communication mechanisms, or a combination thereof. Communications between client 110 and server 102, or other computing devices may employ one or more of various wired or wireless communication protocols, such as IP, TCP/IP, UDP, HTTP, SSL, TLS, FTP, SMTP, WAP, Bluetooth, or WLAN.

Figure 10:
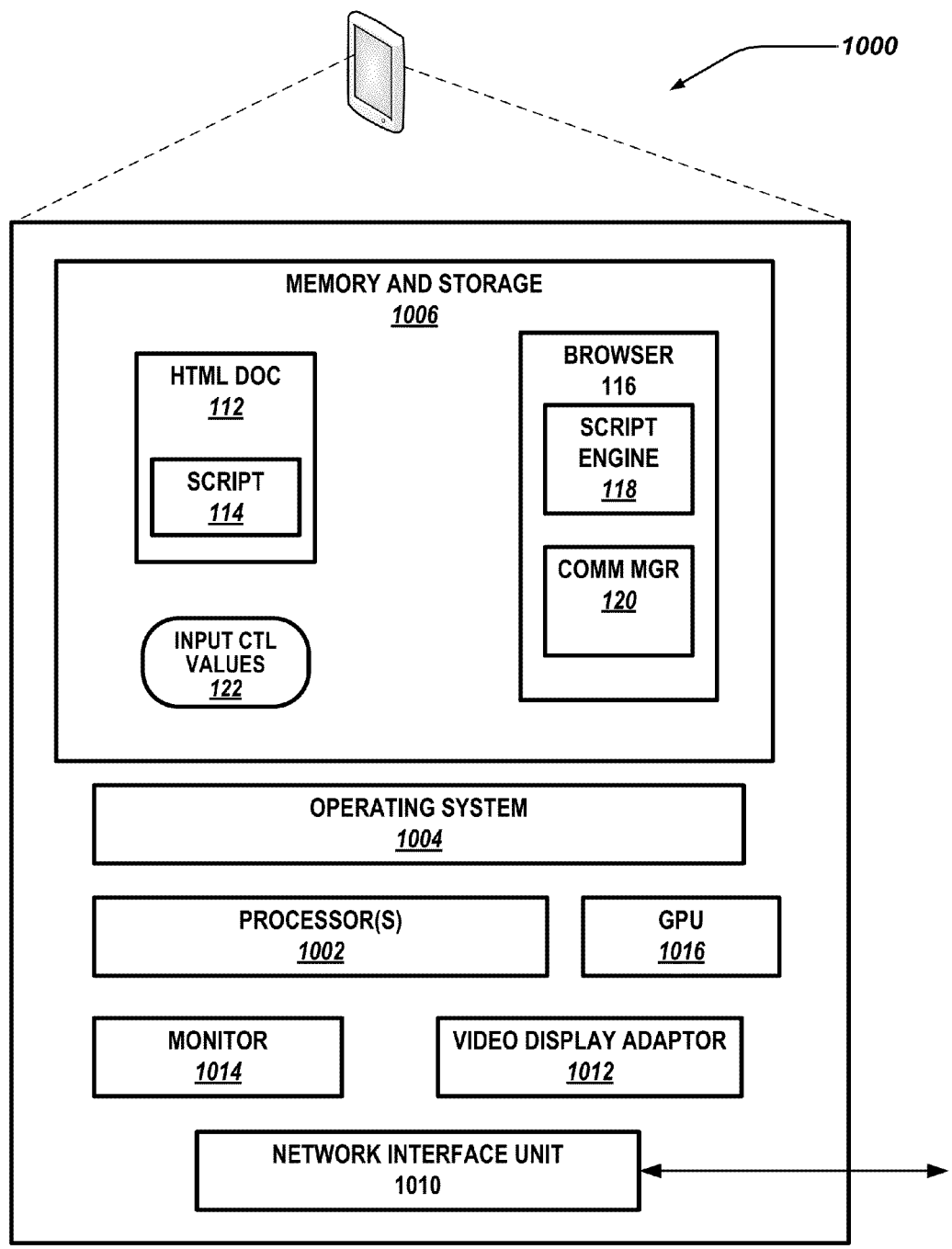
FIG. 10 is a block diagram showing one embodiment of a computing device, illustrating selected components of a computing device that may be used to implement a client device in accordance with mechanisms described herein.

In one embodiment, each of server 102 and client 110 is implemented by one or more computing devices. A computing device may be a special purpose or general purpose computing device. In brief, one embodiment of a computing device that may be employed includes one or more processing units, a memory, a display, keyboard and pointing device, and a communications interface. The one or more processing units may include one or more multiple core processors. Example computing devices include mainframes, servers, blade servers, personal computers, portable computers, communication devices, consumer electronics, or the like. A computing device may include a general or special purpose operating system. The Windows® family of operating systems, by Microsoft Corporation, of Redmond, Wash., are examples of operating systems that may execute on a computing device. FIG. 10 illustrates an example embodiment of a computing device that may be used to implement server 102.

Figure 2:
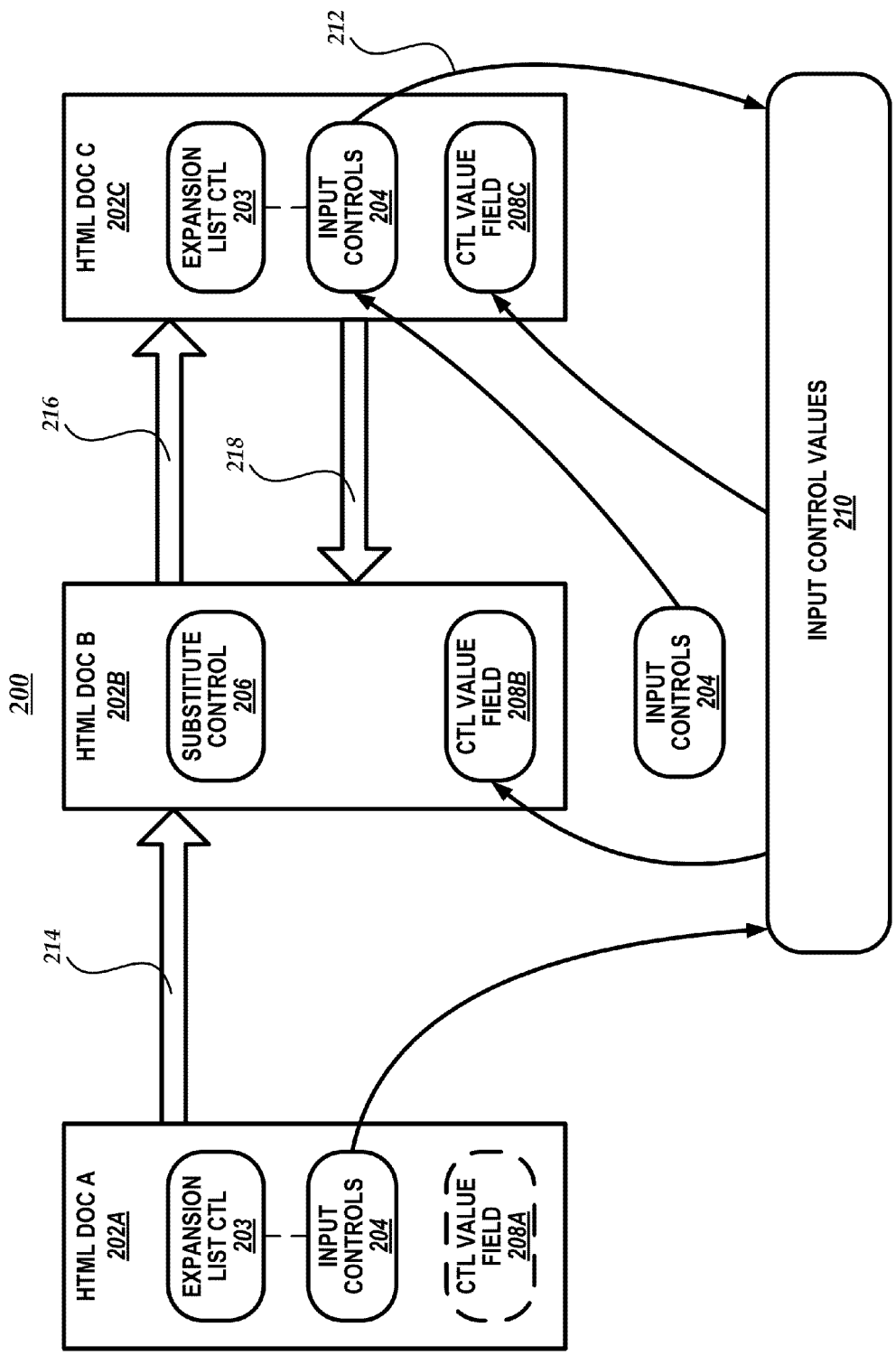
FIG. 2 is a block diagram illustrating a series of states of an HTML document.

FIG. 2 is a block diagram illustrating a series 200 of states of an HTML document, such as HTML document 112. The illustrated embodiment includes three states, referred to as HTML document A 202A, HTML document B 202B, and HTML document C 202C. HTML document 202 is used herein to refer generally to the HTML document without reference to a particular state. In one embodiment, arrows represent transitions 214, 216, and 218 between states, though other transitions may be employed.

In one embodiment, HTML document A 202A represents an HTML document as received by client 110 from server 102, although it may include modifications not related to or necessary for the discussion herein. HTML document A may include expansion list control 203 and a set of input controls 204. In one embodiment, input controls 204 include a list of checkbox controls, though other types of input controls may be used. Each of the input controls may have two or more possible values, and each input control as received may be set to one of the possible values. For example, a checkbox control may have a value of checked or unchecked, though some checkboxes may enable a value of disabled or a value of partially checked. Some sets of input controls may include a large numbers of controls, such as in the thousands or more.

An input control may have a name and a text label, the text label being displayed to a user in a graphical user interface. An input control may be represented by a text string in HTML. For example, Control 1: <input type="checkbox" checked="yes" name="ctl-name" value="CHECKED"/> is a possible representation of a check box having the name "ctl-name," a text label "Control 1," and a default value of checked. The substring "value='CHECKED'" indicates that when the checkbox is checked, its value is the constant CHECKED. An unchecked checkbox may have a value of zero. A non-zero checkbox may correspond to a checkbox with a visual representation of being checked. The value of a checkbox may therefore correspond to its status or visual representation. Some input controls may include a graphic instead of, or in addition to, a text label.

In one embodiment, as indicated by transition 214, HTML document A 202A may be transformed to HTML document B 202B. As discussed in further detail herein, this transformation may be triggered by browser 116 loading or rendering HTML document 202, causing the browser to activate script 114. Script 114 may perform the transformation to HTML document B 202B. This transformation may be "in-place" in that changes are made to HTML document A in memory. The transformation may include making a copy of HTML document A 202A that includes modifications, the result being HTML document B 202B. In the latter case, the original HTML document A 202A may be deleted or retained. Unless clearly indicated otherwise, references herein to changes of state or modifications of an HTML document may refer to in-place changes as well as other types of changes, or combinations thereof, and references to HTML document A, B, or C refer to different states of the same document, regardless of whether an implementation makes each one a copy.

In the illustrated embodiment of FIG. 2, expansion list control 203 and input controls 204 have been detached from HTML document B; substitute control 206 has been added; control value field 208B has been added. As illustrated, input controls 204 remains in memory, though it is not a branch of HTML document B. Detachment of input controls 204 is discussed in further detail herein.

In one embodiment, substitute control 206 refers to an input control that appears visually similar to expansion list control 203, however without a corresponding input control list. In one embodiment, substitute control 206 may refer to expansion list control 203 that has had its association with input controls 204 removed, so it is, in effect, an expansion list control with an empty control list. Substitute control 206 may be inserted into HTML document B 202B at a coordinate position the same as, or close to, expansion list control 203, so that detachment of expansion list control 203 and insertion of substitute control 206 is not noticeable by a user. Some embodiments may omit the use of a substitute control.

In one embodiment, control value field 208B may be used to store, within HTML document B 202B, a value of each input control of input controls 204. In one implementation, control value field 208 is a hidden field. A hidden field is an HTML, element; more specifically a control that does not have a visual representation, though in some implementations, control value field 208B may have a visual representation. In one embodiment, control value field 208B may have an associated text string that indicates a value of each input control. For example, a name-value pair such as "CheckedBoxes=2, 5, 8 . . . " may include a list of input control ordinal values for each input control that is in a checked state. In another example, a name-value pair such as "CheckBoxStates=0, 1, 0, 0, 1, 0, 0, 1" may indicate an ordered binary representation of the value of each input control, delimited by commas. In another example, a collection of text boxes may be represented by a name-value pair in which the value is a comma-delimited list of text strings, such as "TextBoxValues='first string', 'second string',", 'another string'. Various other ways of encoding the input control values may be used. Embodiments with heterogeneous input control types may combine the values into control value field 208B. The example embodiment of FIG. 2 and examples described above illustrate the use of a single control and corresponding control value field to represent the values of multiple input controls. In some embodiments, more than one control value field may be used to represent multiple input controls. For example, in a configuration having multiple checkboxes and multiple text boxes, one control value field may represent the values associated with the checkboxes, and another control value field may represent the values associated with the text boxes. Various other configurations may be used.

In one implementation, control value field 208 may be included in HTML document A 202A when it is sent from the server to the client. This is illustrated by control value field 208A, in dashed lines. In such an implementation, the client may omit adding the control value field to the DOM.

As illustrated in FIG. 2, input control values 210 is associated with HTML document 202. In one embodiment, input control values 210 is a component in memory that stores the values of all input controls 204. In particular, input control values 210 may be implemented as a component that is not attached to HTML document 202. In one embodiment, a transition from HTML document A 202A to HTML document B 202B includes actions that retrieve a value of each input control from input controls 204 and stores it in input control values 210. Mechanisms may include synchronizing control value field 208B to match the corresponding values as stored in input control values 210. The synchronization may occur at the time of transition to HTML document C 202C, or at another time during processing of HTML document 202. Thus, control value field 208B is not necessarily current with the input control values.

In the illustrated embodiment, HTML document C 202C represents another state of HTML document 202. It may be an HTML document following a transition from HTML document B 202B. As discussed in further detail herein, this transition may be triggered by a command to expand the expansion list corresponding to substitute control 206. Processes may receive notification of a user selection of the substitute control and process the notification as a command to expand the expansion list. Thus, a user selection of the substitute control may invoke the command to expand the expansion list. In some embodiments, a command to expand the expansion list may be invoked in another manner, such as a keyboard command, manipulation of another control, or by program logic. Expansion of the expansion list includes displaying the input control list, or a portion thereof. The transition may be performed by script 114. In the illustrated embodiment, substitute control 206 has been removed; expansion list control 203 has been attached to HTML document C; and input controls 204 has been reattached to HTML document C 202C and to expansion list control 203. Each control of input controls 204 may therefore maintain its value from a previous transition.

In various implementations, removal of substitute control 206 may be performed in a variety of ways. For example, it may be detached from HTML document C and saved in memory or deleted. It may be made to be not visible, but left attached to the document. Removal of substitute control 206, as used herein, refers to removal as the appearance of a visible, selectable field.

HTML document C 202C may further include control value field 208C. Each control in control value field 208C may retain the value from control value field 208B, or it may be updated with data from input control values 210 as part of transition 218.

In one embodiment, a user may interact with visual representations of input controls 204. For simplicity of discussion, the visual representation of each input control of input controls 204 is considered to be a part of the input control. Thus, browser 116 may display each input control; a user may select each input control, thereby changing its value, and the browser may update the input control in HTML document 202 to indicate the updated value.

In one embodiment, in response to a user selection of an input control of input controls 204, browser 116 sends a notification message to script 114 indicating the identity of the input control and the action of selection. On the Windows platform, this may be an OnClick message. In response, script 114 may update the corresponding value data in input control values 210. This is represented by arrow 212.

In the illustrated embodiment, HTML transition 218 represents another transition of HTML document 202. As discussed in further detail herein, this transition may be triggered by a command to collapse the expansion list corresponding to expansion list control 203. The transition may be performed by script 114. In the illustrated embodiment, this transition may result in HTML document 202 reverting to a state of HTML document B 202B. As illustrated, expansion list control 203 and input controls 204 have been detached from HTML document C; substitute control 206 has been attached to HTML document B. Control value field 208 remains in HTML document B 202B. Input control values 210 may be used to update control value field 208B as discussed herein.

Figure 3:
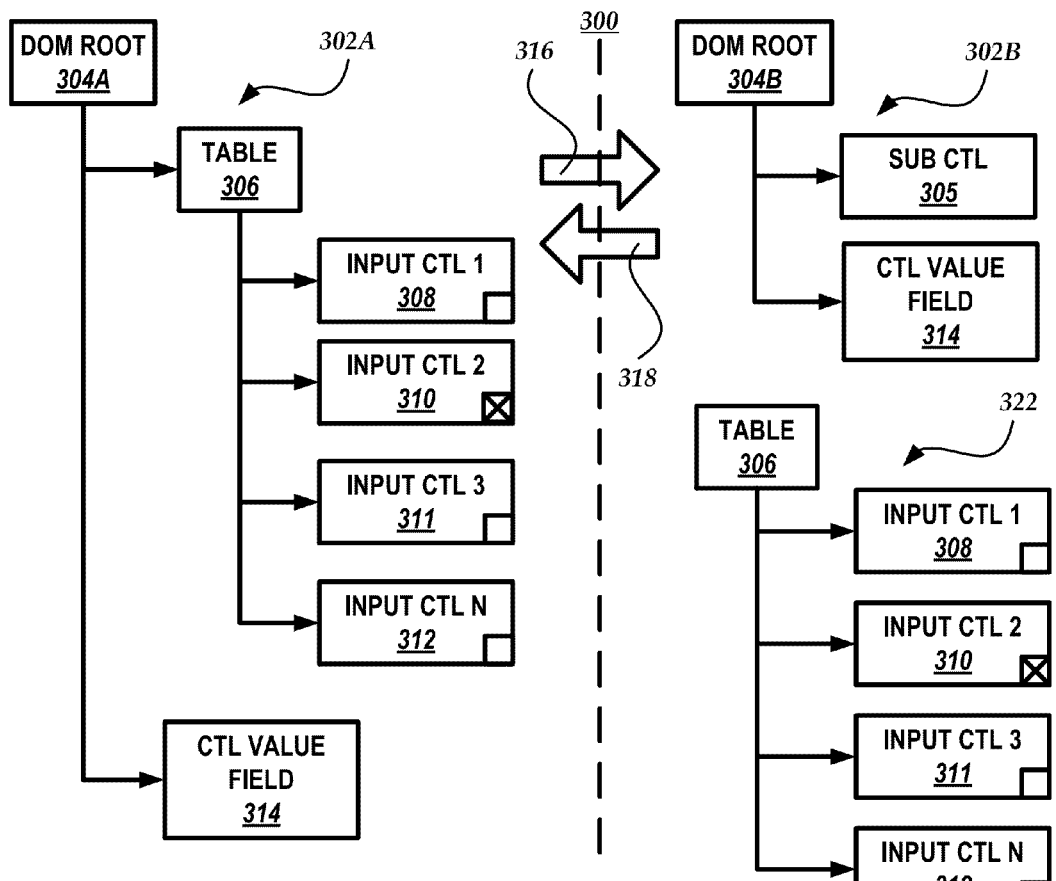
FIG. 3 is a block diagram illustrating example data structures that may be used or generated in accordance with mechanisms described herein.

FIG. 3 is a block diagram illustrating example data structures 300 that may be used or generated in accordance with mechanisms described herein. More specifically, data structures 300 includes portions of two document object models (DOMs) corresponding to HTML documents. An HTML DOM, referred to herein as simply DOM, is a convention for representing and accessing objects in an HTML document. In some systems, as part of rendering an HTML document, a browser or associated libraries, may parse the HTML to create a DOM. Scripts, such as script 114, may retrieve, insert, delete, or modify elements of the HTML by performing actions on the DOM, using an API. A DOM may therefore be considered to be a representation of a corresponding HTML document. As used herein, reference to a DOM is to be considered a reference to its corresponding HTML document, and actions performed to a DOM are considered to be actions performed to the corresponding HTML document.

Figure 4:
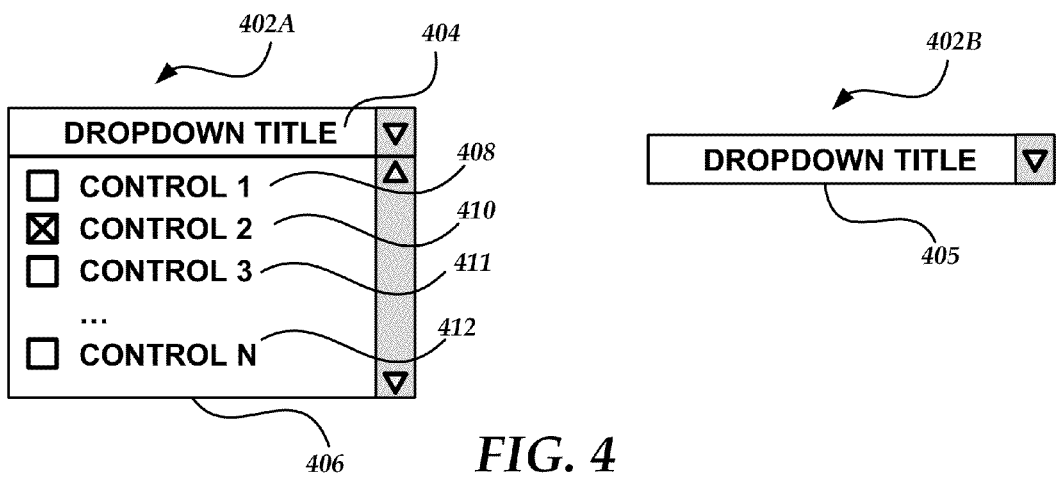
FIG. 4 is a pictorial diagram of two states of a graphical user interface.

FIG. 4 is an example pictorial diagram of two states of a graphical user interface. GUI 402A illustrates an expanded expansion list 406 with a list of checkbox controls displayed. Expansion list 406 includes title bar 404. GUI 402B illustrates a collapsed expansion list, or a substitute control, without checkbox controls. The following discussion of FIG. 3 references elements of FIG. 4.

FIG. 3 includes DOM 302A and DOM 302B, which represent two states of a DOM corresponding to an HTML document. More specifically, DOM 302A corresponds to HTML document A 202A or HTML document C 202C, and DOM 302B corresponds to HTML document B 202B. Each of DOM 302A and DOM 302B is illustrated as a directed graph structure, indicating a hierarchy of elements. Only a portion of each DOM is illustrated in FIG. 3. In various implementations, each DOM may include many more elements.

DOM 302A includes DOM ROOT node 304A, which has child nodes TABLE 306 and CONTROL VALUE FIELD 314. TABLE 306 has child nodes INPUT CONTROL 1 308, INPUT CONTROL 2 310, INPUT CONTROL 3 311, INPUT CONTROL N 312, and may have additional input control nodes not shown. INPUT CONTROL 2 310 is shown as having a value of checked; the rest of the input control nodes are shown having a value of unchecked. INPUT CONTROL nodes represent corresponding input controls that are within a list of expansion list 406. Referring to FIG. 4, TABLE 306 corresponds to expansion list 406; INPUT CONTROL 1 308 corresponds to Control 1 408; INPUT CONTROL 2 310 corresponds to Control 2 410, which is shown as checked; INPUT CONTROL 3 311 corresponds to Control 3 411; and INPUT CONTROL N 312 corresponds to Control N 412. DOM 302A illustrates an example DOM portion as it may appear upon loading or rendering by browser 116. User actions to expand the expansion list may result in a display similar to GUI 402A.

As discussed herein, in one embodiment, upon rendering of HTML document 202 and creation of DOM 302A, script 114 may detach the input controls of an expansion list from the DOM. An arrow represents this transition 316. DOM 302B illustrates an example of a transformation of DOM 302A after this transition. In DOM 302B, TABLE 306 and its child elements have been detached from the tree descending from DOM ROOT 304B. This may be performed by modifying a pointer, invoking a DOM API method, or other action. In one implementation, TABLE 306 and its child elements remain in memory. In one implementation, TABLE 306 or its child elements may be deleted from memory; they may be reconstructed at a subsequent time, such as during transition 318. In the example of FIG. 3, substitute control 305 has been inserted into DOM 302B.

Segment 322 illustrates TABLE 306 and its child elements INPUT CONTROL 1 308, INPUT CONTROL 2 310, INPUT CONTROL 3 31, and INPUT CONTROL N 312 after being detached from DOM 302B. INPUT CONTROL 2 310 retains its value of checked. GUI 402B of FIG. 4 illustrates an example GUI that may be displayed corresponding to DOM 302B. As illustrated, substitute control 405, corresponding to substitute control 305, is displayed, appearing similar to expansion list 406 in its collapsed state which, in this example, displays the title bar. Thus, substitute control 405 appears as title bar 404 of expansion list 406.

DOM 302B illustrates an example DOM portion corresponding to HTML document B 202B. DOM 302A illustrates an example DOM portion corresponding to HTML document A 202A or HTML document C 202C. An arrow represents transition 318 from DOM 302B to DOM 302A. In one implementation, transition 318 from DOM 302B to DOM 302A may include an action of attaching table 306. Attaching TABLE 306 may include modifying the DOM structure to include an element or branch at a specified location. In one implementation, TABLE 306 or its child elements may have been removed from memory. In such an implementation, transition 318 may include reconstructing the table or its child elements. As discussed herein, transition 318 may be triggered by selection of a substitute control or by a command invoked in a different manner.

Figure 5:
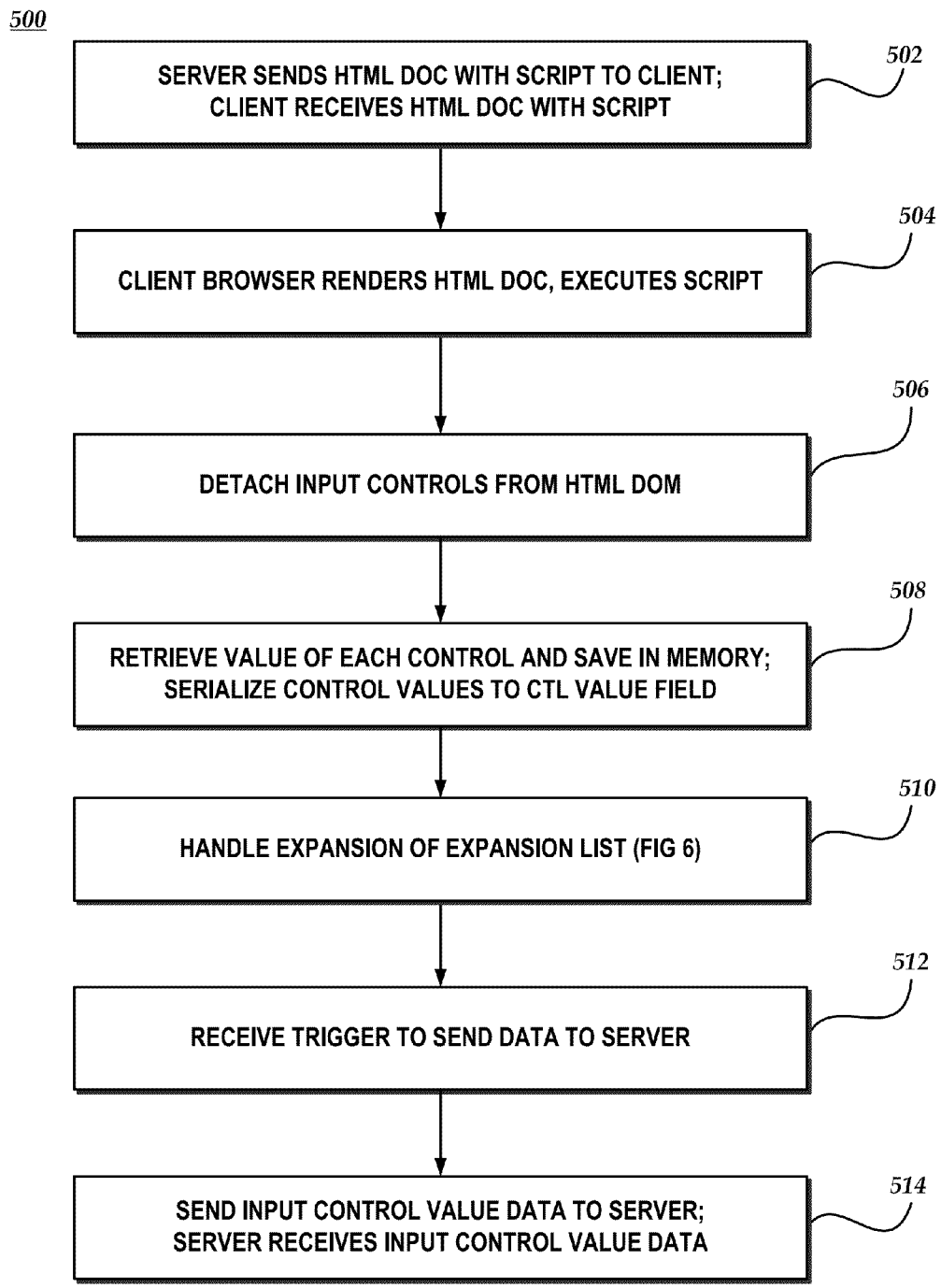
FIG. 5 is a flow diagram illustrating an example embodiment of a process for transforming a DOM, in accordance with some of the mechanisms described herein.

FIG. 5 is a flow diagram illustrating an example embodiment of a process 500 for transforming a DOM, in accordance with some of the mechanisms described herein. Process 500, or a portion thereof, may be performed by various embodiments of system 100, or a variation thereof. Components of system 100 are used as examples of an implementation herein, though in various embodiments, the correspondence of process actions and components may vary. The discussion herein refers to an HTML document, though process 500 may be applied to other types of markup language documents. The illustrated portions of process 500 may be initiated at block 502, where a server, such as server 102 transmits an HTML document to a client, such as client 110. This action may be performed in response to a request from client 110. In one embodiment, the HTML document is sent in accordance with HTTP, SSL, or TLS protocols. It is to be noted that an HTML document may be sent in one or more portions, though the aggregate of the portions is referred to as a single document. As illustrated in FIG. 1, an HTML document may include one or more scripts. The actions of block 502 may include client 110 receiving HTML document A 202A and associated script.

The process may flow to block 504, where a client browser, such as browser 116, loads, or renders the HTML document. The browser may include program logic to execute the associated script as part of, or in response to, rendering the HTML document. Though not illustrated, rendering the HTML document may include generating a DOM, such as DOM 302A, representing the HTML document.

The process may flow to block 506, where input control elements associated with an expansion list are detached from the DOM. As discussed herein, detachment of input control elements may be performed by modifying the DOM structure so that the elements, or a branch including the elements, are not attached to the DOM. In one implementation, DOM API methods are used to detach and attach one or more elements, or a branch of elements. In one system RemoveElement( ) or InsertElement( ) are used to remove or insert an element from or to the DOM. In some implementations, the DOM may be modified so that the input control elements are attached in a different way so that the original attachment is not functional.

The process may flow to block 508, where the value of each input control is retrieved and saved in memory. One implementation of this is illustrated by arrow 212 of FIG. 2, where value data from each of input controls 204 is stored in input control values 210. The actions of block 508 may include serializing the input control values and saving the serialized data to control value field 208C. Thus, control value field 208C may remain as a DOM element though the input control elements are detached from the DOM. In some implementations, serializing and saving data to a control value field may be performed separately from the other actions of block 508. The completion of block 508 may correspond to HTML document B 202B or DOM 302B and segment 322.

Figure 6:
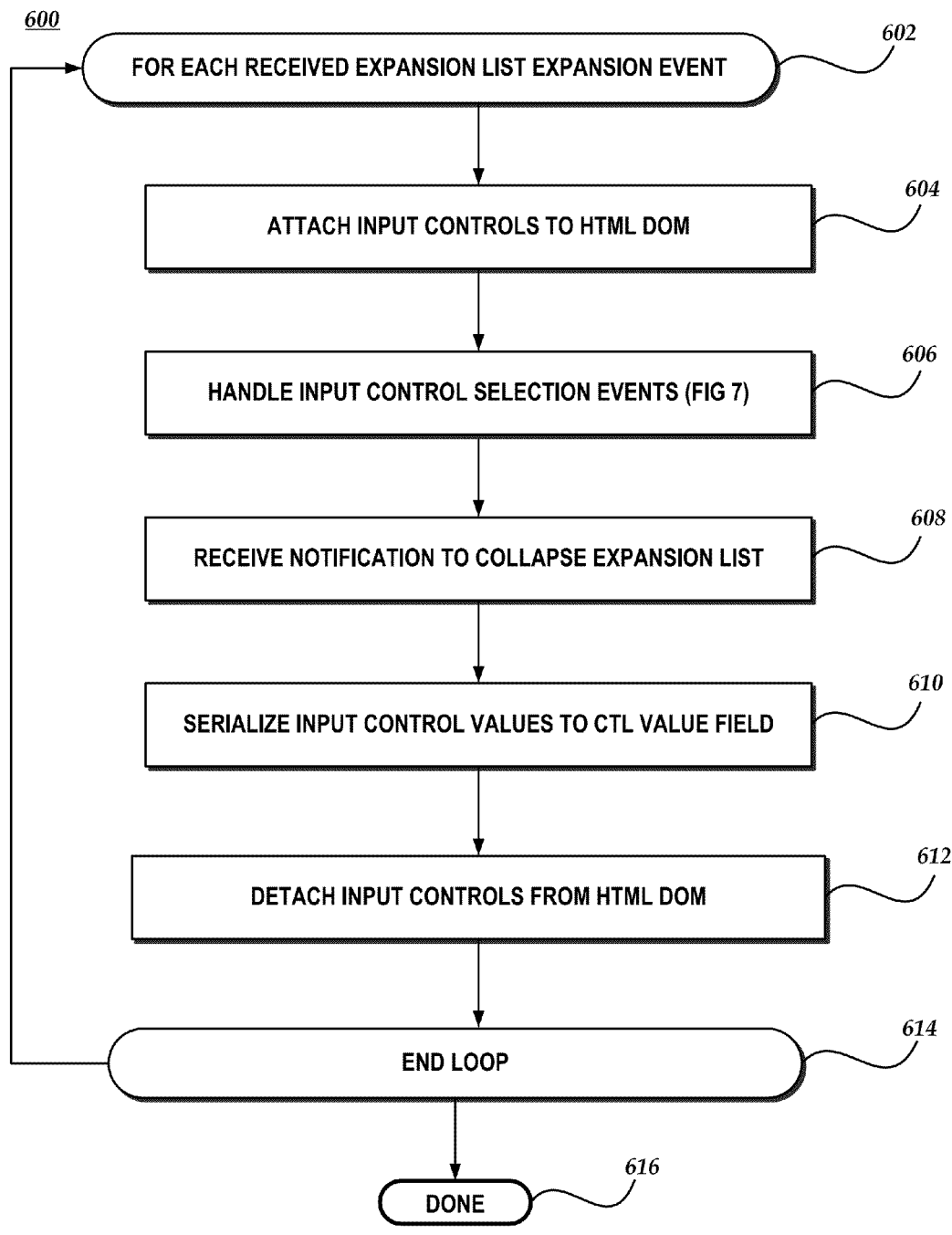
FIG. 6 is a flow diagram illustrating an example embodiment of a process for handling expansion and collapsing of an expansion list.

The process may flow to block 510, where, a process of handling expansion and collapsing of the expansion list may be performed. Further details of these actions in an example embodiment are illustrated in FIG. 6 and discussed herein.

The process may flow to block 512, where a command or event is received that indicates input control value data is to be sent to the server. One or more of a variety of triggers may be used as such. For example, in one implementation, collapsing of the expansion list is considered to be such a trigger. In one implementation, activation, deactivation, or selection of a control causes such a trigger. Other examples may include a timer, closing of the HTML page, or other program logic.

In response to receiving such a trigger, the process may flow to block 514, where input control value data is sent to server 102. In one implementation, this action includes sending the data of control value field 208 to the server. In one implementation, this action may be performed or facilitated by communication manager 120. The actions of block 514 may include the server receiving the input control value data from the client.

The process may flow to other actions, not shown, exit or return to a calling program. For example, in response to receiving the input control value data from client 110, server 102 may send to the client additional HTML data. Client 110 may receive this additional data and insert it into HTML document 112, render it separately, or otherwise process it.

In one implementation, the actions of blocks 506 to 514, or a portion thereof, may be performed by script 114. Detaching the input controls from the DOM may result in a reduction of processing at block 514. Communication manager 120 may avoid enumerating numerous input control elements, thereby reducing processing time or other resources.

FIG. 6 is a flow diagram illustrating an example embodiment of a process 600 for handling expansion and collapsing of an expansion list. Process 600 may be used to implement at least a portion of block 510 of FIG. 5. The illustrated portions of process 600 may be initiated at block 602, which begins a loop that iterates for each expansion list expansion event received. The loop is referred to herein as loop 602. It includes blocks 604-612, and is terminated by block 614. In various environments, loop 602, may iterate, zero, one, or more times.

Within loop 602, an iteration begins when an expansion event is received. An expansion event may be any notification or command indicating the expansion list is to be expanded. An expansion event may be processed as a command to expand the expansion list. In one system, this may be an ExpandDropDown event. The process may flow to block 604, where input controls that are attached to the DOM. In some embodiments, the set of input controls that are attached in block 604 were previously attached to the DOM and then detached from the DOM. For example, the input controls may have been detached at block 506 of process 500. In other embodiments, the input controls being attached at block 604 may have not been previously attached. As illustrated in FIG. 3, in one implementation, the detached input controls are stored in memory, and the actions of attachment include modifying the DOM, such as by invoking InsertElement( ), to include the input controls in the DOM. In one environment, attachment of the input controls to the DOM causes the browser to display them, or at least a portion thereof. The completion of block 604 may correspond to HTML document A 202A or DOM 302A.

Figure 7:
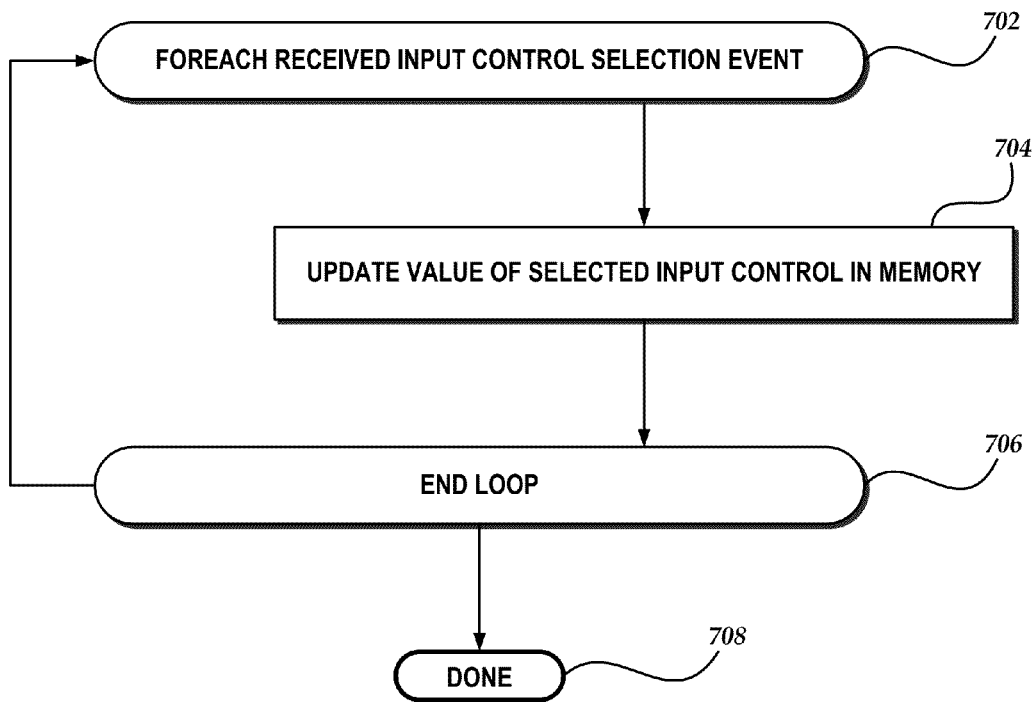
FIG. 7 is a flow diagram illustrating an example embodiment of a process for handling selection of input controls associated with an expansion list.

The process may flow to block 606, where input control selection events may be handled. Further details of these actions in an example embodiment are illustrated in FIG. 7 and discussed herein.

The process may flow to block 608, where a notification to collapse the expansion list may be received. The notification may result from a user action, such as clicking outside of the expansion list, clicking on the expansion list title, a keyboard or other input. The notification may result from a timer or other program logic. As for the expansion event, a collapse notification may be any notification or command indicating the expansion list is to be collapsed, and is processed as a command to collapse the expansion list.

In response to receiving the notification to collapse, the process may flow to block 610, where the value of each input control may be retrieved and serialized. The serialized value data may be saved to an element of the DOM, such as control value field 208 or 314.

The process may flow to block 612, where the input control elements associated with the expansion list are detached from the DOM. These actions are similar to the actions of block 506 of FIG. 5, discussed herein. The completion of block 612 may correspond to HTML document B 202B or DOM 302B and segment 322.

The process may flow to block 614. At block 614, upon completion of the iterations, loop 602 may exit. The process may flow to done block 616. The process may flow to other actions, not shown, exit or return to a calling program.

FIG. 7 is a flow diagram illustrating an example embodiment of a process 700 for handling selection of input controls associated with an expansion list. Process 700 may be used to implement at least a portion of block 606 of FIG. 6. The illustrated portions of process 700 may be initiated at block 702, which begins a loop that iterates for each input control selection event received. The loop is referred to herein as loop 702. It includes block 704, and is terminated by block 706. In various environments, loop 702, may iterate, zero, one, or more times.

Within loop 702, an iteration begins when a selection event is received. In one system, this may be an OnClick event indicating the input control that has been selected. The process may flow to block 704, where the value of the indicated input control is updated in memory. As illustrated in FIG. 2, the input control values may be stored in a component such as input control values 210. In some configurations, selection of an input control may cause toggling of the value between two values, such as checked and unchecked. In some configurations, selection of an input control event may cause rotation of the value among three or more possible values.

The process may flow to block 706. At block 706, upon completion of the iterations, loop 702 may exit. The process may flow to done block 708. The process may flow to other actions, not shown, exit or return to a calling program.

Though not illustrated in FIG. 7, in one embodiment, a command to set a state on a set of input controls may be received. For example, a "Check All" or "Clear All" option in a GUI may result in a command to set the states of all controls to checked, or unchecked, respectively. Upon receiving such a command, the process sets the value of each control accordingly.

Although processes 500, 600, and 700 are described by referring to one server, one client, one browser, and one expansion list, in some configurations, multiple instances of these processes may be performed concurrently. A server or application server may transmit markup language documents with associated scripts to multiple clients, receiving input control values from the clients concurrently. An HTML document may include multiple expansion lists that are concurrently processed as described. A client may have multiple browser instances or browser pages that are concurrently active, while performing the described processes. A script configured as described may have multiple instances concurrently or sequentially performing the described processes.

Figure 8:
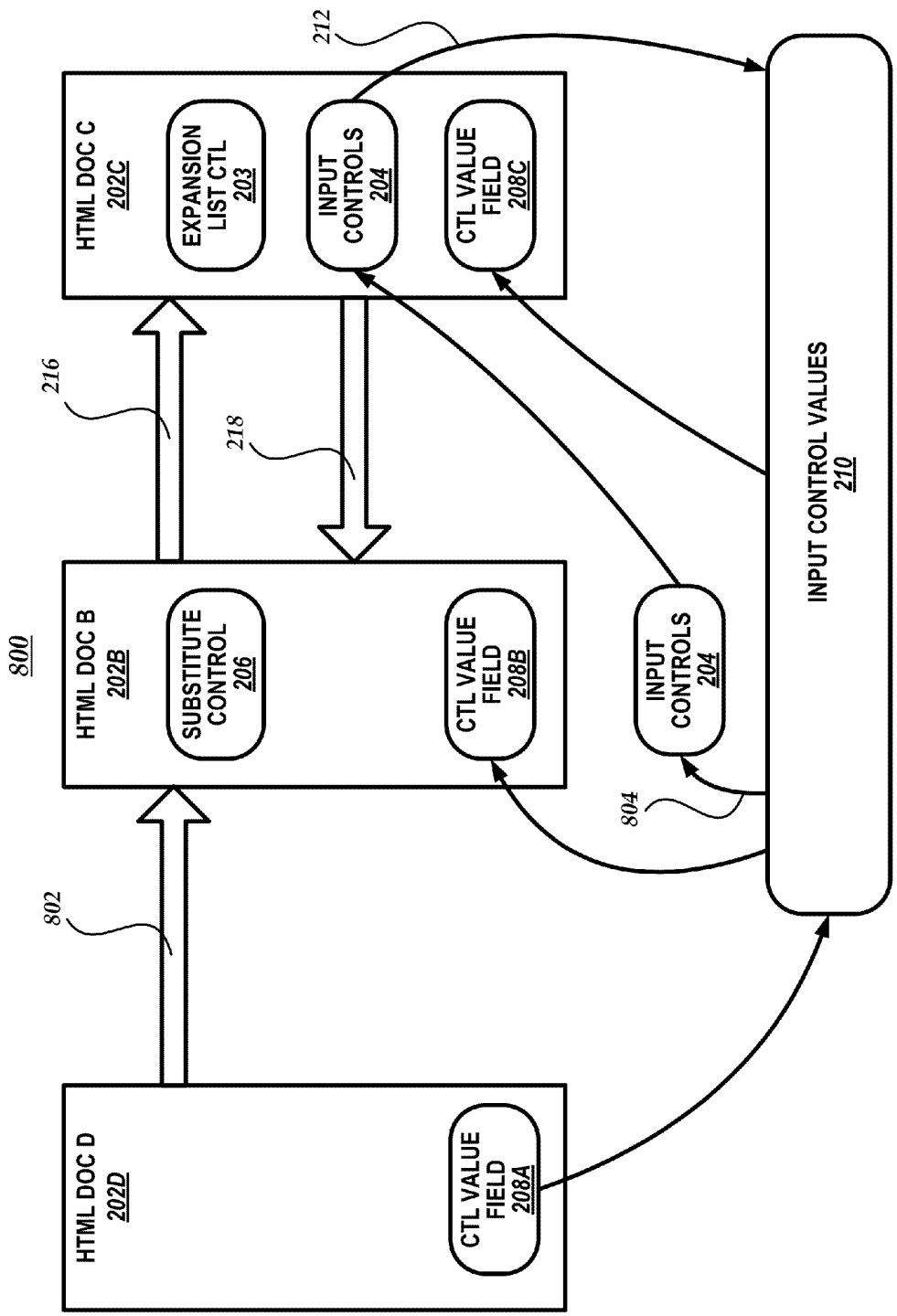
FIG. 8 is a block diagram illustrating a series of states of an HTML document.

FIG. 8 is a block diagram illustrating a series 800 of states of an HTML document, such as HTML document 112. FIG. 8 is a variation of FIG. 2, and illustrates an implementation that is a variation of that discussed with reference to FIG. 2. In one implementation, HTML document D 202D, sent from server 102 to client 110, includes control value field 208A and omits expansion list control 203 and input controls 204, of FIG. 2. This reduces the amount of HTML code that is sent from the server. Upon loading or rendering of HTML document D 202D, script 114 may perform transition 802. Script 114 may retrieve the value of each input control from control value field 208A, storing it in input control values 210. Script 114 may generate input controls 204 in memory, leaving it detached from HTML document 202. The actions of detaching the input controls at the time of document rendering may therefore be omitted, in that they are created detached. The creation of input controls 204 may include populating each control value with data from input control values 210, as indicated by arrow 804. Similarly, the removal of the expansion list control at rendering time may be omitted.

Remaining components of FIG. 8 may be as described with reference to FIG. 2. Transitions 216 and 218 may also be as described. A variation of process 500 may include program logic to receive and process HTML document D 202D, as illustrated and described herein. For example, in one embodiment of such a variation, block 506 may be omitted; the markup language document may be sent from the server with a control value field included; block 508 may omit serializing control values to a control value field; and actions of creating a set of input controls in memory, detached from the DOM, but available to be attached, may be performed following block 508.

In one embodiment, script 114 may include program logic to perform actions as illustrated in FIG. 2 and actions as illustrated in FIG. 8, based on what is received from the server. In one embodiment, a server may dynamically determine whether to send an HTML document in accordance with FIG. 2 or FIG. 8, based on factors such as bandwidth, server load, or client processing power.

Figure 9:
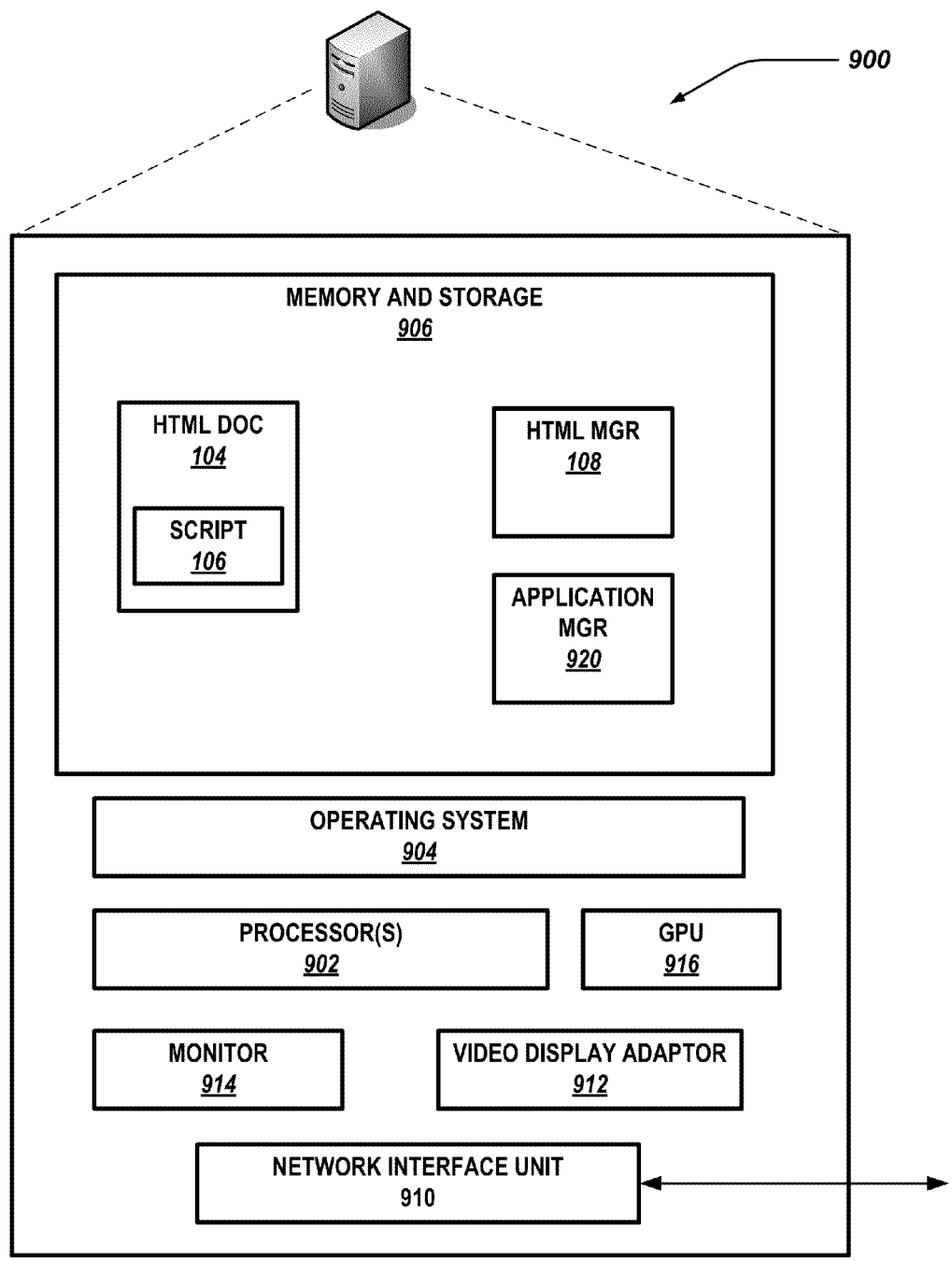
FIG. 9 is a block diagram showing one embodiment of a computing device, illustrating selected components of a computing device that may be used to implement a server in accordance with mechanisms described herein.

FIG. 9 is a block diagram showing one embodiment of a computing device 900, illustrating selected components of a computing device that may be used to implement mechanisms described herein, including server 102 and at least portions of processes 500, 600, or 700. Computing device 900 may include many more components than those shown, or may include less than all of those illustrated. Computing device 900 may be a standalone computing device or part of an integrated system, such as a blade in a chassis with one or more blades. Though the components of computing device 900 are illustrated as discrete components, any one or more of them may be combined or integrated into an integrated circuit, such as an ASIC.

As illustrated, computing device 900 includes one or more processors 902, which perform actions to execute instructions of various computer programs. In one configuration, each processor 902 may include one or more central processing units, one or more processor cores, one or more ASICs, cache memory, or other hardware processing components and related program logic. As illustrated, computing device 900 includes an operating system 904. Operating system 904 may be a general purpose or special purpose operating system. The Windows® family of operating systems, by Microsoft Corporation, of Redmond, Wash., includes examples of operating systems that may execute on computing device 900.

In one embodiment, computing device 900 includes one or more graphics processing units (GPU) 916. A GPU is a processor that is configured to perform graphics operations, such as rendering a graphic image, or to perform stream processing.

Memory and storage 906 may include one or more of a variety of types of non-transitory computer storage media, including volatile or non-volatile memory, RAM, ROM, solid-state memory, disk drives, optical storage, or any other medium that can be used to store digital information.

Memory and storage 906 may store one or more components described herein or other components. In one embodiment, memory and storage 906 stores HTML document 104, script 106, and application server 108. In various embodiments, one or more of these components may be omitted from memory and storage 906. In some embodiments, at least a portion of one or more components may be implemented in a hardware component, such as an ASIC. In various configurations, multiple components implementing the functions or including the data of these components may be distributed among multiple computing devices. Communication among various distributed components may be performed over a variety of wired or wireless communications mechanisms.

Any one or more of the components illustrated as stored in memory and storage 906 may be moved to different locations in RAM, non-volatile memory, or between RAM and non-volatile memory by operating system 904 or other components. In some configurations, these components may be distributed among one or more computing devices, including computing devices that are remotely located from each other.

Computing device 900 may include a video display adapter 912 that facilitates display of data, scene frames, or other information to a user. Though not illustrated in FIG. 9, computing device 900 may include a basic input/output system (BIOS), and associated components. Computing device 900 may also include a network interface unit 910 for communicating with a network. Software components, such as those stored in memory and storage 906, may be received via transitory media and network interface unit 910. Computing device 900 may include one or more display monitors 914. Embodiments of computing device 900 may include one or more input devices (not shown), such as a keyboard, pointing device, touch screen, keypad, audio component, microphone, voice recognition component, or other input/output mechanisms.

A server configured as described herein or with various modifications may communicate with one or more clients to facilitate mechanisms described herein. Mechanisms described may reduce the amount of data that is transmitted from server to client or client to server, or reduce the amount of processing or resources used by each client. These advantages may provide an improved experience for users of client devices. Other advantages may also be obtained by use of these mechanisms.

FIG. 10 is a block diagram showing one embodiment of a computing device 1000, illustrating selected components of a computing device that may be used to implement mechanisms described herein, including client 110 and at least portions of processes 500, 600, or 700. Computing device 1000 may include many more components than those shown, or may include less than all of those illustrated. Computing device 1000 may be a standalone computing device or part of an integrated system, such as a blade in a chassis with one or more blades. Though the components of computing device 1000 are illustrated as discrete components, any one or more of them may be combined or integrated into an integrated circuit, such as an ASIC. The descriptions of like-numbered components in FIG. 10 may be applicable to corresponding components of FIG. 10, and should be considered as such unless specifically stated otherwise.

In one embodiment, memory and storage 1006 of FIG. 10 stores one or more data structures, such as HTML document 112, script 114, or input control values 122. Memory and storage may store browser 116, associated script engine 118, or communication manager 120. Each of these data structures or executable programs may be implemented or stored in a variety of ways, including being distributed across multiple computing devices.

It will be understood that each block of the flowchart illustrations of FIGS. 5-7, and combinations of blocks in each flowchart illustration, can be implemented by software instructions. These program instructions may be provided to a processor to produce a machine, such that the instructions, which execute on the processor, create means for implementing the actions specified in the flowchart block or blocks. The software instructions may be executed by a processor to provide steps for implementing the actions specified in the flowchart block or blocks. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A computer-based method of processing a document having a plurality of input controls, the method comprising:
   a) in response to a command to display the plurality of input controls, attaching the plurality of input controls to the document;
   b) in response to a command to hide the plurality of input controls, detaching the plurality of input controls from the document;
   c) inserting a substitute control in the document and displaying the substitute control in response to the command to hide the plurality of input controls, the command to display the plurality of input controls is invoked by a user selection of the substitute control; and
   d) sending a value of each input control to a server.

2. The computer-based method of claim 1, further comprising, in response to rendering the document, detaching the plurality of input controls from the document.

3. The computer-based method of claim 1, further comprising:
   a) in response to a user selection of an input control of the plurality of input controls, storing a value of the selected input control in memory detached from the document; and
   b) in response to the command to hide the input controls, storing the value of each input control in an element of the document.

4. The computer-based method of claim 1, the document including an expansion control that includes the plurality of input controls, the method further comprising:
   a) inserting another control in the document;
   b) receiving a notification that the other control is selected; and
   c) processing the notification as the command to display the plurality of input controls.

5. The computer-based method of claim 1, the document is an HTML document having an associated script, the script performing the actions of detaching and attaching.

6. The computer-based method of claim 1, further comprising employing a script associated with the document to insert a field into the document and store the value of each input control in the field.

7. The computer-based method of claim 1, further comprising:
   a) in response to the command to hide the plurality of input controls, encoding the value of each input control in a hidden field of the document; and
   b) receiving, after encoding the value of each input control in the hidden field, a command to send the value of each input control to the server,
   and in response, sending at least a portion of the hidden field to the server.

8. The computer-based method of claim 1, wherein sending the value of each input control to the server is performed at a configuration in which the plurality of input controls are detached from the document.

9. A computer-based system, comprising:
   a) a markup language based document including a plurality of values, each value representative of a corresponding input control of a set of input controls associated with an expansion control;
   b) a script associated with the markup language based document, the script configured to perform actions on a client device including:
      i) in response to loading or rendering the markup language based document, detaching the set of input controls from a document object model (DOM) representative of the markup language document;
      ii) attaching the set of input controls to the DOM;
      iii) inserting a substitute control in the DOM and displaying the substitute control in response to a command to display the expansion control, a command to display at least a portion of the set of input controls is invoked by a user selection of the substitute control; and
      iv) maintaining an input control value component in memory, the input control value component including a value of each input control of the set of input controls; and
   c) an application server configured to perform actions including:
      i) transmitting the markup language based document and the script to the client device; and
      ii) receiving, from the client device, the value of each input control of the set of input controls.

10. The computer-based system of claim 9, the set of input controls associated with an expansion control, the script actions further including attaching the set of input controls to the DOM in response to a command to expand the expansion control, and detaching the set of input controls from the DOM in response to a command to collapse the expansion control.

11. The computer-based system of claim 9, the script actions further including inserting a hidden field into the DOM, the hidden field including a value of each input control of at least a portion of the set of input controls.

12. The computer-based system of claim 11, the script actions further including receiving, after detaching the set of input controls from the DOM, a command to transmit the value of each input control to the server and, in response to the command to transmit, transmitting the hidden field to the server.

13. The computer-based system of claim 9, further comprising a processor that executes instructions to perform the actions of the application server.

14. The computer-based system of claim 9, wherein the markup based document is received from a server, the received document includes the plurality of values, and omits the set of input controls, the script actions further including employing each value representative of the corresponding input control to create the corresponding input control detached from the DOM.

15. A computer-readable storage device comprising computer program instructions for processing user manipulation of a set of input controls associated with an expansion control in a markup language document, the program instructions executable by one or more processors to perform actions including:
   a) receiving a notification that the expansion control is to be collapsed and in response detaching the set of input controls from a document object model (DOM) representing the markup language document;
   b) attaching the set of input controls to the DOM in response to a command to display at least a portion of the set of input controls;
   c) inserting a substitute control in the DOM and displaying the substitute control in response to the notification that the expansion control is to be collapsed, the command to display at least a portion of the set of input controls is invoked by a user selection of the substitute control; and
   d) storing a value of each input control of the set of input controls in a field of the DOM, the field remaining in the DOM after the set of input controls is detached from the DOM.

16. The computer-readable storage device of claim 15, detaching the set of input controls is performed in response to rendering the markup language document, the computer-readable storage device comprising at least one of an application specific integrated circuit (ASIC), a compact disk (CD), a digital versatile disk (DVD), a random access memory (RAM), a read only memory (ROM), a hard disk, an electrically erasable programmable read only memory (EEPROM), a flash memory, or a memory stick.

17. The computer-readable storage device of claim 15, further comprising the markup language document, the computer program instructions encoded in a script associated with the markup language document.

18. The computer-readable storage device of claim 15, wherein storing the value of each input control of the set of input controls is performed in response to receiving the notification that the expansion control is to be collapsed.

* * * * *